US011036514B1

(12) United States Patent
Reynolds et al.

(10) Patent No.: US 11,036,514 B1
(45) Date of Patent: Jun. 15, 2021

(54) SCHEDULER ENTRIES STORING DEPENDENCY INDEX(ES) FOR INDEX-BASED WAKEUP

(71) Applicant: Apple Inc., Cupertino, CA (US)

(72) Inventors: Sean M. Reynolds, Cupertino, CA (US); Gokul V. Ganesan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 415 days.

(21) Appl. No.: 15/244,125

(22) Filed: Aug. 23, 2016

(51) Int. Cl.
G06F 9/38 (2018.01)
G06F 9/48 (2006.01)

(52) U.S. Cl.
CPC .......... G06F 9/3838 (2013.01); G06F 9/3836 (2013.01); G06F 9/4881 (2013.01)

(58) Field of Classification Search
CPC .............................. G06F 9/3836; G06F 9/3838
See application file for complete search history.

(56) References Cited

U.S. PATENT DOCUMENTS

| 7,363,467 | B2 | 4/2008 | Vajapeyam et al. | |
| 7,464,253 | B2 | 12/2008 | Veidenbaum et al. | |
| 7,991,979 | B2 | 8/2011 | Abernathy et al. | |
| 8,464,029 | B2 | 6/2013 | Day et al. | |
| 8,918,625 | B1* | 12/2014 | O'Bleness | G06F 9/3834 712/214 |
| 2007/0043932 | A1* | 2/2007 | Kulkarni | G06F 9/3836 712/214 |
| 2010/0306509 | A1* | 12/2010 | Day | G06F 9/3834 712/217 |
| 2012/0023314 | A1* | 1/2012 | Crum | G06F 9/3826 712/214 |
| 2013/0326198 | A1* | 12/2013 | Meier | G06F 9/3834 712/216 |
| 2014/0181476 | A1* | 6/2014 | Srinivasan | G06F 9/3838 712/208 |
| 2015/0026436 | A1* | 1/2015 | Achenbach | G06F 9/3836 712/214 |
| 2017/0351522 | A1* | 12/2017 | Ayub | G06F 9/3838 |

FOREIGN PATENT DOCUMENTS

WO 15145192 10/2015

* cited by examiner

Primary Examiner — Jacob Petranek
(74) Attorney, Agent, or Firm — Kowert, Hood, Munyon, Rankin & Goetzel, P.C.; Erik A. Heter

(57) ABSTRACT

A method and apparatus for performing an indexed data dependency instruction wakeup is disclosed. A scheduler may issue one or more instruction operations from a number of entries therein, including a first instruction operation. In a second entry, a comparison operation may be performed between a dependency index and an index of the first instruction operation. A match between the index of the first instruction and the dependency index in the second entry indicates a dependency of the corresponding instruction on the first instruction, and further indicates that the first instruction operation has issued. The dependency may be determined based solely on the match between the dependency index and the index of the first instruction. Responsive to determining that the first instruction operation has issued in the second entry, an indication that a corresponding second instruction operation is ready to issue may be provided.

20 Claims, 5 Drawing Sheets

US 11,036,514 B1

SCHEDULER ENTRIES STORING DEPENDENCY INDEX(ES) FOR INDEX-BASED WAKEUP

BACKGROUND

Technical Field

This disclosure is directed to schedulers, and more particularly, schedulers used in processors and/or other types of circuits.

Description of the Related Art

Many modern processors include a circuit unit known as a scheduler that is used to issue instructions when ready for execution. A scheduler may include at least one array that stores information corresponding to a number of previously decoded instruction operations. Based on the information stored within the various entries, logic within a scheduler may determine when the corresponding instruction is ready for issue.

In issuing instructions for execution, a scheduler may enforce ordering requirements. For a given instruction, ordering requirements may be determined based on whether it has a data dependency, i.e. it needs the result from execution of another instruction in order to properly execute. Dependencies may be predicted or precisely determined. Instructions that do not have dependencies may, at least in some cases, be allowed execute in any order. Instructions that have dependencies may be required to wait until one or more other instructions have executed. Accordingly, a scheduler may include mechanisms that determine whether an instruction associated with a given entry has a dependency. A scheduler may also include mechanisms for determining another instruction upon which a given instruction is dependent.

SUMMARY

A method and apparatus for performing an indexed data dependency instruction wakeup is disclosed. In one embodiment, a scheduler may issue one or more instruction operations from a number of entries therein, including a first instruction operation. In other entries of the scheduler, including a second entry, a comparison operation may be performed between a dependency index and an index of the first instruction operation. A match between the index of the first instruction operation and the dependency index in one of the entries (e.g., the second entry) indicates a dependency of the corresponding instruction operation on the first instruction operation, and further indicates that the first instruction operation has issued. The dependency may be determined based solely on the match between the dependency index and the index of the first instruction operation. Responsive to determining that the first instruction operation has issued in, e.g., the second entry, an indication that a corresponding second instruction operation is ready to issue may be provided.

In one embodiment, the scheduler may be configured to issue the second instruction operation on the next cycle following the issuance of the first instruction operation (where the second has a dependency on the first). For example, the first instruction operation may be a store instruction that, when executed, causes data to be stored to memory. The second instruction operation may be a load instruction that, when executed, causes loading of the data that is to be stored by executing the store instruction. However, this example is not intended to be limiting, as it can apply to any dependency. For example, an instruction may have a register dependency instead of a data dependency.

As noted above, the determination of whether the first instruction operation has issued may, at least in some cases, be based solely on an index comparison. Thus, in contrast to prior art embodiments, tag comparisons need not be performed for the waking of all dependent instruction operations (even if a tag is present), nor is there any requirement to read the payload of the first instruction operation and transmit it to the instruction operation dependent therefrom. Thus, the process of determining that the first instruction operation has issued, and thus, that the second instruction operation is ready to issue, may be simplified. In one embodiment of a scheduler disclosed herein, the index-based wakeups (i.e. wakeup is solely based on the index comparison) may co-exist with tag based comparison to allow wakeups to occur using the latter when desirable.

BRIEF DESCRIPTION OF THE DRAWINGS

The following detailed description makes reference to the accompanying drawings, which are now briefly described.

Figure 1:
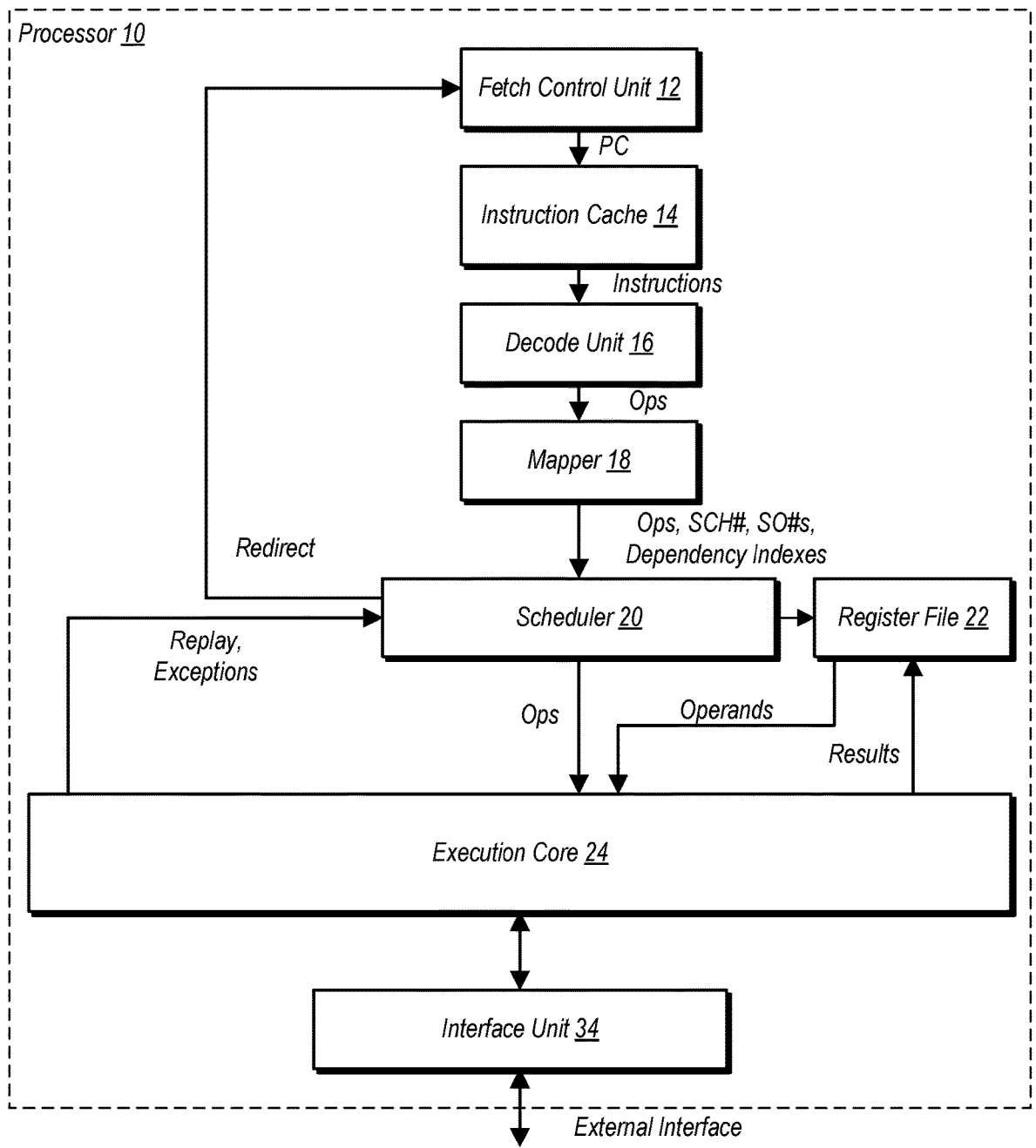
FIG. 1 is a block diagram of one embodiment of a processor.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units", "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Turning now to FIG. 1, a block diagram of one embodiment of a processor 10 is shown. Processor 10 may implement microarchitecture capable of processing instructions for any one of a number of different instruction set architectures. In the illustrated embodiment, the processor 10 includes a fetch control unit 12, an instruction cache 14, a decode unit 16, a mapper 18, a scheduler 20, a register file 22, an execution core 24, and an interface unit 34. The fetch control unit 12 is coupled to provide a program counter (PC) for fetching from the instruction cache 14. The instruction cache 14 is coupled to provide instructions to the decode unit 16. Decode unit 16 is configured to decode each instruction into one or more instruction operations (ops), and is coupled to provide decoded instruction operations to mapper 18. The mapper 18 is coupled to provide ops, a scheduler index (SCH #), source operand numbers (SO #s), and one or more dependency indexes to the scheduler 20. The scheduler 20 is coupled to receive replay and exception indications from the execution core 24, is coupled to provide a redirect indication to the fetch control unit 12, is coupled to the register file 22, and is coupled to provide ops for execution to the execution core 24 (in an alternate embodiment, the scheduler may receive a dependency tag from the mapper and may generate the scheduler index within). The register file is coupled to provide operands to the execution core 24, and is coupled to receive results to be written to the register file 22 from the execution core 24. The execution core 24 is coupled to the interface unit 34, which is further coupled to an external interface of the processor 10. In one embodiment, each of the various units shown in FIG. 1, and subunits thereof, may be implemented using various types of circuitry.

It is noted that while only a single execution core 24 is shown in FIG. 1, embodiments of a processor having multiple execution cores (e.g., for different types of operands such as floating point, fixed point, and memory) are possible and contemplated.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.). In the illustrated embodiment, the redirection may be provided by the scheduler 20. In other embodiments, redirection may be provided by the execution core 24, or some redirects may be provided from the execution core 24 while others are provided from the scheduler 20.

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions.

The decode unit 16 may generally be configured to decode the instructions into instruction operations (ops). Generally, an instruction operation may be an operation that the hardware included in the execution core 24 is capable of executing. Each instruction may translate to one or more instruction operations which, when executed, result in the performance of the operations defined for that instruction according to the instruction set architecture. In some embodiments, each instruction may decode into a single instruction operation. Embodiments in which some instructions decode into a single instruction operation while other instructions decode into multiple instruction operations are also possible and contemplated. The decode unit 16 may identify the type of instruction, source operands, etc., and the decoded instruction operation may comprise the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 16 and mapper 18 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 16 may be provided to the mapper 18. The mapper 18 may implement register renaming to map source register addresses from the ops to the source operand numbers (SO #s) identifying the renamed source registers. Additionally, the mapper 18 may assign a scheduler entry to store each op, identified by the SCH # (scheduler index), although other embodiments in which the scheduler index is generated internal to scheduler 20 are possible and contemplated. In one embodiment, the SCH # may also identify the rename register assigned to the destination of the op. In other embodiments, the mapper 18 may assign a separate destination register number.

Additionally, the mapper 18 may generate dependency indexes for the op. The dependency indexes may identify the ops on which a given op is dependent. More particularly, the dependency index may be the index of another op upon which a given op is dependent. As will be discussed in further detail below, the dependency index may provide a basis for a compare operation to determine when an op upon which another op is dependent has been issued for execution by the scheduler. Since some instructions may not have a dependency, the dependency index may instead be written as a code (e.g., all logic zeros) that is indicative of the same. Alternate embodiments are possible and contemplated wherein mapper 18 may generate dependency tags instead of dependency indexes. These tags may refer to the age of the producer op (i.e. the op upon which another op, referred to as the consumer op, is dependent). In cases where an op has no dependency thereon, the tag may be written as (or include) a code that indicates the same.

The mapper 18 may provide the ops, along with SCH #, SO #s, and dependency indexes for each op to the scheduler 20. The scheduler 20 may store the ops in the scheduler entries identified by the respective SCH #s, along with the SO #s. Scheduler 20 may include at least one array configured to store information associated with each instruction provided thereto by mapper 18. The array may include a number of entries. In the illustrated example, the array includes M entries, numbered 0 to M−1. Each entry may store an index associated with a corresponding op, a dependency index if the op is dependent upon another op (or a null value if there is no dependency), a ready bit used to indicate if the instruction is ready for issuance, and a dependency indication (separate from the dependency index) if the op is dependent on another op. Other information to be stored may include a tag (indicative of an age of the op), and payload information (e.g., indicative of operands or data associated with the op). Various alternate embodiments may store all of the information noted above, some (but not all) of the information noted above, other information not explicitly discussed herein, or a combination of these possibilities. Each entry may also include comparison logic for comparing its dependency index with an index of one or more ops that have issued. As noted above, an alternative embodiment is contemplated wherein, instead of providing the SCH # for a given op, a dependency tag is provided by mapper 18. Scheduler 20 may determine the index based on the dependency tag provided thereto.

The scheduler may evaluate which ops are eligible for scheduling, e.g. based on the ready bit of entries in the array. The scheduler 20 may schedule the ops for execution in the execution core 24. When an op is scheduled, the scheduler 20 may read its source operands from the register file 22 and the source operands may be provided to the execution core 24. The execution core 24 may return the results of ops that update registers to the register file 22. In some cases, the execution core 24 may forward a result that is to be written to the register file 22 in place of the value read from the register file 22 (e.g. in the case of back to back scheduling of dependent ops). Embodiments are also possible and contemplated in which source operands are provided by scheduler 20 itself. The source operands may be received by scheduler 20 from mapper 18, register file 22, or execution core 24.

The register file 22 may generally comprise any set of registers usable to store operands and results of ops executed in the processor 10. In some embodiments, the register file 22 may comprise a set of physical registers and the mapper 18 may map the logical registers to the physical registers. The logical registers may include both architected registers specified by the instruction set architecture implemented by the processor 10 and temporary registers that may be used as destinations of ops for temporary results (and sources of subsequent ops as well). In other embodiments, the register file 22 may comprise an architected register set containing the committed state of the logical registers and a speculative register set containing speculative register state.

The interface unit 34 may generally include the circuitry for interfacing the processor 10 to other devices on the external interface. The external interface may comprise any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components.

In various embodiments, the processor 10 may implement any instruction set architecture.

Figure 2:
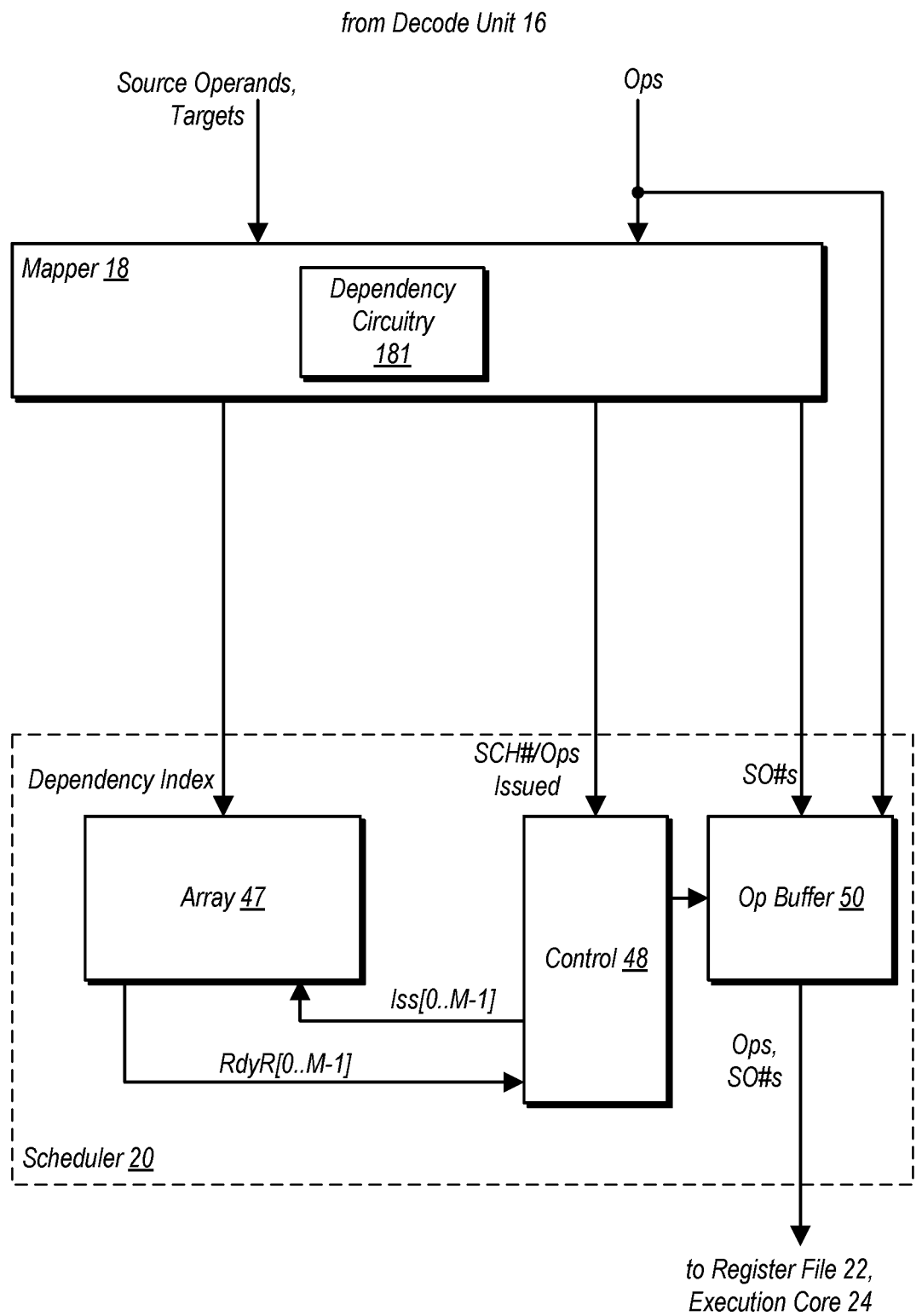
FIG. 2 is a block diagram illustrating one embodiment of a scheduler and a mapper coupled thereto.

FIG. 2 is a block diagram illustrating one embodiment of a scheduler and a mapper coupled thereto. Mapper 18 in the embodiment shown is includes circuitry that generates various pieces of information received by scheduler 20. Scheduler 20 in the embodiment shown includes an array 47, a control logic 48, and an op buffer 50. Array 47 may include a number of entries, wherein the information stored therein corresponds to an op stored in op buffer 50. Array 47 and control logic 48 may receive various pieces of information (e.g., indexes, dependency indexes, etc.) from mapper 18. Op buffer 50 of scheduler 20 in this particular embodiment may receive ops directly from decode unit 16. Source operand numbers (SO #) may be received by op buffer 50 from mapper 18.

Mapper 18 may assign an index to an instruction op that is to be provided to buffer 50. The index (SCH #) may be a spatial property of a given entry relative to other entries in array 47, and may be provided to control logic 48 in scheduler 20. Mapper 18 may also include dependency circuitry 181 that predicts or otherwise detects dependencies among ops. For those ops that have a dependency on another, the dependency circuitry 181 in mapper may generate a dependency index to be provided to array 47 of scheduler 20.

Although not explicitly shown, mapper 18 in some embodiments may provide a tag to scheduler 20, with the scheduler generating the dependency index for an entry. In cases where the consumer and the producer are concurrently provided, scheduler 20 may have no way to know a dependency index ahead of time since the producer index has not yet been computed. In such case, scheduler 20 may perform an associative search for a matching tag to generate the dependency index for the consumer.

In some alternate embodiments, dependency circuitry 181 in mapper 18 may generate, for ops having a dependency, a dependency tag that is provided to control logic 48 of scheduler 20. The control logic 48 may then generate the dependency index that is provided to the entry in array 47 currently storing information corresponding to the dependent op.

As noted above, array 47 in the embodiment shown includes a number of entries, each of which corresponds to an op provided to scheduler 20. Each entry has an index (which is a property of the entry itself) and may store, for the corresponding op, a dependency index if the op has a dependency on another op, a tag, and a ready bit that, when set, may indicate the corresponding op is ready for issue. Some embodiments of an entry may also include a dependency bit, separate from the dependency index, that when set indicates the op has a dependency on another op. Each entry may also include comparison logic for comparing its dependency index with the index of issued ops. In embodiments having a dependency bit, this comparison may be performed when the dependency bit is set, otherwise no comparison is performed. When a match occurs during such a comparison, it indicates the issuance of an op upon which the op associated with the entry is dependent (i.e. issuance of the producer upon which the consumer is dependent). Thus, scheduler 20 may be used to perform index-based wakeup of ops having dependencies on other ops. It is noted that the wakeup of such ops with dependencies may be determined, at least in some cases, based solely on the index comparison. This is in contrast to prior art schedulers in which the waking of an op necessarily includes tag comparisons and payload reads. The index may typically comprise fewer bits than the tag, and thus the comparison operation may be simplified. Furthermore, there is no operation corresponding to reading a payload of the op upon which another op is dependent. Accordingly, the index based wakeup of instruction operations may be simplified relative to prior art schedulers, and may be performed faster. This is in large part due to the fact that the only information needed to determine when an op having a dependency is ready for issue is the location (in the array) of the op upon which it is dependent. In this embodiment, the location of an op in the array it its index, and thus the dependency index indicates the location of the op upon which it is dependent.

It is noted however, that within at least some embodiments of scheduler 20, the index-based wakeups described above may co-exist with tag-based wakeups. For example, if mapper 18 provides a tag instead of an index, tag-based wakeups may be performed in some instances. Furthermore, scheduler 20 may wake up a new entry if the index containing a matching tag has been scheduled (i.e. issued) or if none is found. Scheduler 20 may also, in some embodiments, block the waking of a new entry if before the dependency index has been found, e.g., by using a dummy dependency index that does not match any entry.

In the embodiment shown, control logic 48 includes circuitry that may select one or more ops to be issued for execution. When an op is issued for execution, its index may be transmitted to entries in the array. Entries that have a dependency and are not indicated as ready for issue may, in their comparison logic, compare the index of the issued op(s) to their respective dependency index. If a match occurs in a given entry, it indicates thereto that the op upon which its corresponding op is dependent has issued. Responsive to the match, the entry may set its ready bit, indicating that it is ready to issue. In at least some cases, an op corresponding to an entry in which a match occurs may be issued one cycle (e.g., one clock cycle) later than the op upon which it is dependent.

Consider an example in which a load op has a dependency on a store op. When the store op is issued by control logic 48, its index may be transmitted to the various entries in the array. In those entries which are marked as not ready and as having a dependency (including the load op), a comparison of the index to a corresponding dependency index is performed. In this example, the comparison performed in the entry corresponding to the load op will result in a match between its dependency index and the index of the issued store op. Responsive thereto, the entry corresponding to the load op will set its ready bit, indicating to control logic that it is ready for issue. On a next cycle following that during which the store op was issued, the load op may issue. It is noted that this example is not intended to be limiting, as similar operations may be carried out in which the dependencies are based on ops other than load and/or store ops.

In determining which ops are to be issued, control logic 48 may read the ready bits of entries in array 47 and may select from among those having a ready bit that is set. In some embodiments, other factors may also be considered in determining which ops are to issue. For example, some ops may have stricter latency requirements than others, and thus may issue before those with less strict latency requirements in the event both types are marked as ready. Amount of time stored in the scheduler may also be considered in some embodiments, as some ops associated with older entries marked ready may be selected before those that have been in the scheduler for less time. After an op has been selected for issue, it may be forwarded from op buffer 50 to an execution core 24 for execution, with its corresponding operands being forwarded to register file 22.

Figure 3:
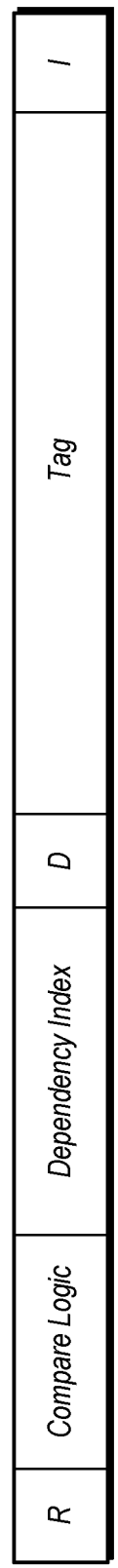
FIG. 3 is a diagram illustrating fields in one embodiment of a scheduler entry.

Turning now to FIG. 3, a diagram illustrating one embodiment of a scheduler entry is shown. In the embodiment shown, entry 471 is an exemplary entry of array 47 shown in FIG. 2. Entry 471 includes a number of fields that provide information regarding an associated op that has been received by scheduler 20 and stored in op buffer 50.

The 'R' field in entry 471 indicates that an entry is ready to issue. In one embodiment, this indication may be a single bit that when reset (e.g., logic 0) indicates that the op is not ready for issue, and when set (e.g., logic 1) indicates that the op is ready for issue. When determining which ops to select for issue, control logic 48 may read the 'R' field of various entries and select ops corresponding to those indicated as ready but not issued.

The T field in entry 471 may be used to indicate whether a corresponding op has issued. This indication may also be a single bit that, when set, indicates the op has issued. When assigning ops to scheduler 20, mapper 18 may scan array 47 for entries having the bit set in the 'I' field, as these entries can be overwritten. Furthermore, when determining which ops are to be issued during a given cycle, control logic may ignore those having their respective 'I' bit set, since their corresponding ops were issued in a previous cycle.

The 'D' field in entry 471 is used to indicate whether its corresponding op has a dependency on another op. When the 'D' field is in a reset state, entry 471 may ignore an index broadcast thereto when other op is issued. If the 'D' field is set, entry 471 may determine if a dependency is satisfied based on an index of another op that is issuing during the current cycle.

Determination of whether a dependency is satisfied during a given cycle may be performed using the compare logic and the information stored in the dependency index field. As noted above, the dependency index may indicate the index of another op upon which the op associated with that entry is dependent. When one or more ops are selected for issue, their respective indexes are broadcast to entries in array 47. In each entry 471 marked as not ready and having a dependency, the compare logic may compare its dependency index with those that were broadcast. A match between a broadcast index and the dependency index of an entry 471 indicates that satisfying of the dependency is imminent. Thus, a match between the index of the producer and the dependency index of the consumer indicates to the latter that the former has issued. The index of the producer (which is identical to the dependency index of the consumer) is the only piece of information used in determining that the producer has issued, irrespective of other pieces of information available to the scheduler regarding each op provided thereto.

Upon determining that the producer has issued, the entry corresponding to the consumer may set its ready indication ('R'), thereby communicating to control logic 48 that it is ready to issue. Control logic 48 may then select the consumer for issue as early as the next cycle after the producer has issued.

Entry 471 in the embodiment shown also includes a tag field that may store a tag that, e.g., indicates an age of the information in that entry, and thus the amount of time that the entry and its corresponding op have been in the scheduler. However, in contrast to prior art embodiments, this tag is not used in determining when an op is ready for issue.

Although entry 471 shown here includes certain fields and compare logic, it is noted that other embodiments are possible and contemplated. Such embodiments may include different information, and in some cases, do not include all of the fields shown here. For example, embodiments that do not include the 'D' field, indicative of a dependency, are possible. In such embodiments, the presence or absence of a dependency may be indicated by a special code in the dependency index field that does not correspond to an index number in array 47 (e.g., all logic 1's). In general, entry 471 may be configured to store any needed information for a particular embodiment of a scheduler.

Figure 4:
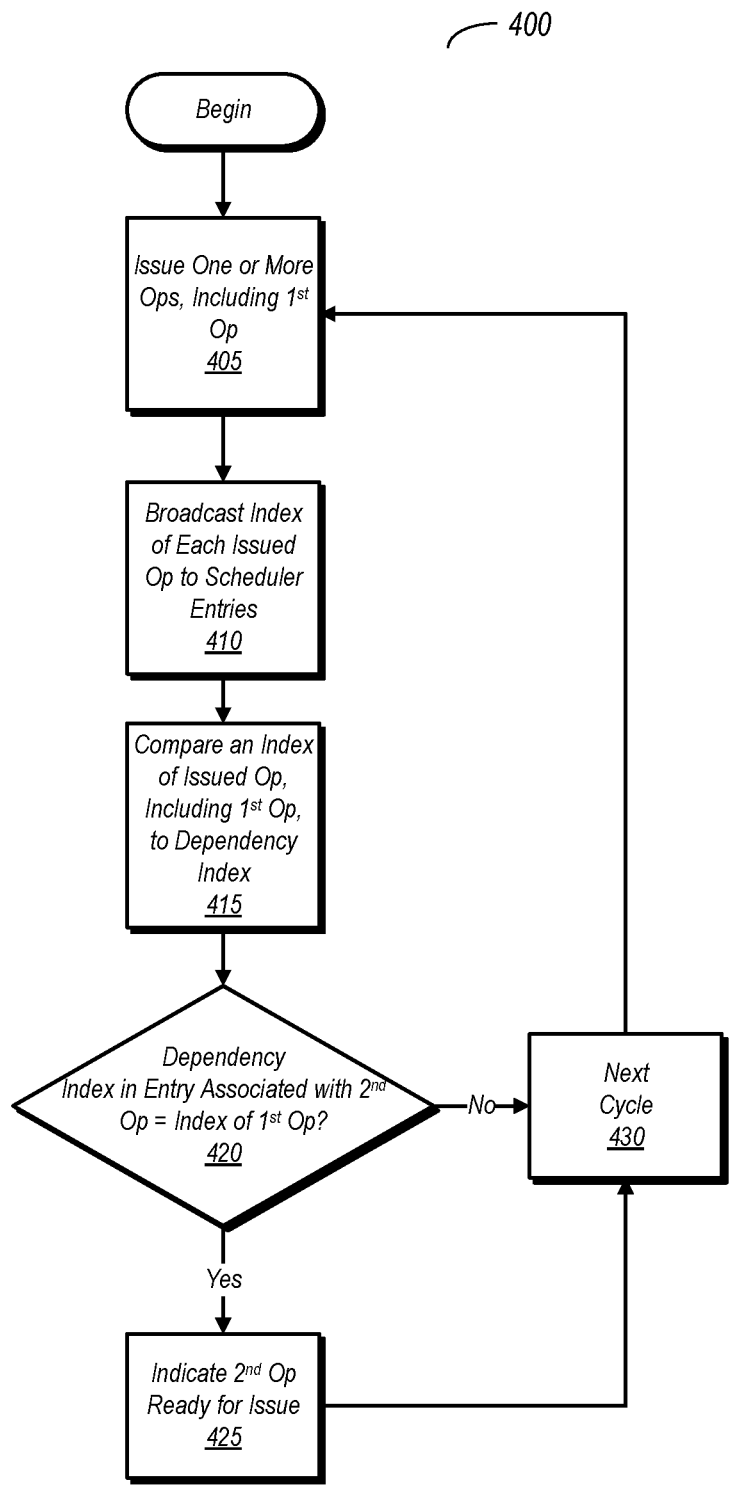
FIG. 4 is a flow diagram illustrating one embodiment of a flow diagram for index-based wakeup of dependent instructions.

FIG. 4 is a flow diagram illustrating one embodiment for performing an index-based wakeup of instruction operations. Method 400 may be performed with various embodiments of the hardware/circuitry shown in FIGS. 1-3 and discussed above. Hardware/circuit embodiments not explicitly discussed herein may also be capable of performing method 400, and thus fall within the scope of this disclosure. It is further noted that embodiments wherein at least some portions of method 400 are performed at least in part using software and/or firmware are also possible and contemplated. In general, method 400 may be performed using various combinations of hardware, firmware, and software, and any such embodiment may be considered to fall within the scope of this disclosure.

Method 400 begins with the issuance of one or more ops for execution (block 405). The op(s) may be issued by a scheduler, with each being forwarded to an execution core capable of executing that type of op (e.g., if the op works with floating point data, it may be forwarded to a floating point execution core). In at least some cycles, the issued ops may include a producer, i.e. a first op upon which a second op (i.e. a consumer) is dependent.

For each issued op, including the first op (producer), a respective index may be broadcast to the various entries of an array within the scheduler (block 410). In entries associated with an op having a dependency on another op and which are marked as not being ready for issue, a comparison operation may be performed (block 415). The comparison operations may compare the broadcast index for each issued instruction to a corresponding dependency index stored in that entry. The comparison operation is essentially a check by each consumer to determine if its corresponding producer has issued. The comparisons in this example include comparing the index of the first op, a producer, to a dependency index in each entry for which comparisons are performed.

If a match occurs between the index of the first op and the dependency index associated with a second op (block 420, yes), the second op may be marked ready for issue (block 425). This may be accomplished by, e.g., setting the ready bit in the corresponding entry. The match between the index of the first op and the dependency index associated with the second op indicates to the consumer (the second op) that its producer (the first op) has issued. The ready bit may be set based solely on the match between the index of the producer and the dependency index associated with the consumer, with no other information required for comparison. Furthermore, the scheduler may select the consumer to issue as early as one cycle later than the producer.

If no match occurs between a producer and a consumer (block 420, no), method 400 proceeds to the next cycle (block 430), returning to block 405. Similarly, after a match occurs and an entry (or entries if multiple producers issue and multiple matches occur), method 400 proceeds to the next cycle (block 430) and returns to block 405.

Figure 5:
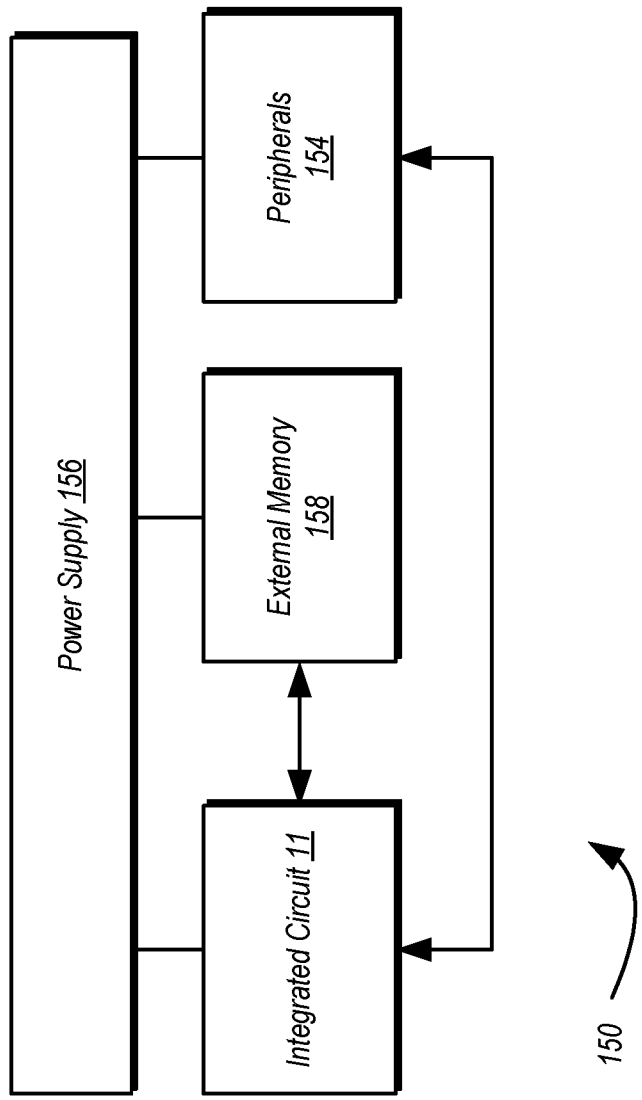
FIG. 5 is a block diagram of one embodiment of an exemplary system.

Turning next to FIG. 5, a block diagram of one embodiment of a system 150 is shown. In the illustrated embodiment, the system 150 includes at least one instance of an integrated circuit 11 coupled to external memory 158. The integrated circuit 11 may include a memory controller that is coupled to the external memory 158. The integrated circuit 11 is coupled to one or more peripherals 154 and the external memory 158. A power supply 156 is also provided which supplies the supply voltages to the integrated circuit 11 as well as one or more supply voltages to the memory 158 and/or the peripherals 154. In some embodiments, more than one instance of the integrated circuit 11 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. A processor comprising:
    a scheduler including a plurality of entries, wherein the scheduler is configured to associate ones of the plurality of entries with a corresponding instruction operation; and
    a mapper circuit configured to provide decoded instruction operations to the scheduler, wherein the mapper circuit is further configured to generate and provide, to the scheduler, an index indicative of a particular one of the plurality of entries in which the ones of the instruction operations are to be stored, and wherein the mapper circuit is further configured to provide, to the scheduler, a dependency index for a particular instruction operation that indicates any dependencies for the particular instruction operation relative to instruction operations previously provided to the scheduler;
    wherein the scheduler is further configured to perform a dependency check operation that includes:
        generating a dependency index indicating any dependencies between instruction operations provided concurrently from the mapper circuit;
        issuing a first instruction operation associated with a first one of the plurality of entries;
        broadcasting to the plurality of entries, responsive to issuing the first instruction, an index of the first instruction;
        performing a comparison in at least a second entry of the plurality of entries, the second entry being associated with a second instruction operation, wherein performing the comparison comprises comparing the index of the first instruction operation with a dependency index of the second instruction operation;
        determining, based on the comparison indicating a match between the index of the first instruction operation and the dependency index in the second entry, that the first instruction has issued and indicating, in the second entry, that the second instruction operation is ready to issue responsive to determining that the first instruction operation has issued.

2. The processor as recited in claim 1, wherein the scheduler is further configured to issue the second instruction operation one cycle later than the first instruction responsive to the second entry indicating that the second instruction operation is ready to issue.

3. The processor as recited in claim 1, wherein the mapper circuit includes a prediction circuitry configured to predict dependencies of at least some instruction operations on other instruction operations.

4. The processor as recited in claim 1, wherein the first instruction operation is a store instruction and the second instruction operation is a load instruction that is dependent on a payload of the store instruction.

5. The processor as recited in claim 1, wherein the ones of the plurality of entries in the scheduler includes a dependency index field and comparison circuitry configured to compare an index associated with an issued instruction operation to a dependency index stored in the dependency index field.

6. The processor as recited in claim 1, wherein the ones of the plurality of entries in the scheduler includes a ready bit that, when set, indicates that an instruction operation associated with that entry is ready to issue.

7. The processor as recited in claim 1, wherein the ones of the plurality of entries in the scheduler includes a field indicative of whether a dependency is associated with an instruction in that entry.

8. The processor of claim 1, wherein the ones of the plurality of entries includes a dependency indication that, when set, indicates that an instruction operation stored in that entry is dependent on another instruction operation, and wherein, responsive to broadcasting an index to an instruction, comparisons are performed exclusively in entries in which a corresponding dependency index is set.

9. A method comprising:
    a mapper circuit providing decoded instruction operations, including first and second instruction operations, to a scheduler, the scheduler having a plurality of entries, wherein ones of the plurality of entries include a dependency indication that, when set, indicates that a corresponding instruction operation has a dependency on another instruction operation;
    the mapper circuit further providing, to the scheduler with decoded instruction operations, an index indicative of a particular one of the plurality of entries in which its associated instruction operation is to be stored;
    the scheduler performing a dependency checking operation, the dependency checking operation comprising:
        the scheduler issuing the first instruction operation from a first entry of the plurality of entries;
        the scheduler broadcasting to the plurality of entries, responsive to issuing the first instruction, an index of the first instruction;
        the scheduler comparing, only in those ones of the plurality of entries in which a dependency indication is set, including a second entry that is associated with a second instruction operation, an index of the first instruction operation with a dependency index indicative of a dependency of the second instruction operation;
        the scheduler determining, in the second entry and based on the comparing indicating a match between the index of the first instruction operation and the dependency index, that the first instruction operation has issued, wherein the match further indicates that the dependency of the second instruction operation is on the first instruction operation; and the scheduler indicating, in the second entry, that the second instruction operation is ready to issue responsive to determining that the first instruction operation has issued.

10. The method as recited in claim 9, further comprising a prediction circuit in the mapper circuit predicting dependencies for at least some instruction operations provided to the scheduler.

11. The method as recited in claim 9, further comprising issuing the second instruction operation one cycle later than the first instruction operation responsive to determining that the second instruction operation has a dependency on the first instruction operation.

12. The method as recited in claim 9, further comprising, during a given cycle, comparing in at least a subset of the plurality of entries, indexes for instructions issued in a given cycle to dependency indexes in ones of the subset of the plurality of entries.

13. The method as recited in claim 9, further comprising setting a ready bit in given ones of the plurality of entries responsive to determining that their corresponding instructions are ready to issue.

14. The method as recited in claim 9, wherein the first instruction operation is a store instruction and the second instruction operation is a load instruction.

15. The method of claim 9, further comprising the scheduler generating a corresponding dependency index for instruction operations having a dependency on another instruction operation.

16. An apparatus, comprising:
a scheduler having a plurality of entries, wherein the scheduler is configured to store an instruction operation received from a mapper circuit in one of a plurality of entries that corresponds to an index associated with the instruction operation, wherein responsive to selecting a first instruction operation for issue, the scheduler is configured to perform operations including:
broadcasting, to the plurality of entries, an index associated with the first instruction operation;
comparing, in only those ones of the plurality of entries that have a dependency indication set, the index associated with the first instruction operation to a corresponding dependency index stored in the ones of the plurality of entries with the dependency indication set; and
responsive to the index of the first instruction operation matching a dependency index in one of the plurality of entries corresponding to a second instruction operation, selecting the second instruction operation for issue.

17. The apparatus of claim 16, wherein the scheduler is configured to provide the first instruction operation to an execution unit in a first cycle, and responsive to determining that the first instruction has issued, provide the second instruction operation to the execution unit in a second cycle immediately following the first cycle.

18. The apparatus of claim 16, wherein the scheduler is configured to:
receive and store a consumer instruction operation, an index, and a corresponding dependency index responsive to a producer instruction operation being provided to the scheduler prior to the consumer instruction operation, the consumer instruction operation being dependent on the producer instruction operation; and
generate the dependency index associated with the consumer instruction operation responsive to the consumer and producer instruction operations being concurrently provided from the mapper circuit.

19. The apparatus of claim 16, wherein ones of the plurality entries includes:
compare logic configured to compare a dependency index of that entry with an index broadcast by the scheduler;
a dependency indication that, when set, causes the compare logic to compare the dependency index with the index broadcast by the scheduler, wherein the dependency indication is further configured to, when reset, cause the compare logic to ignore the index broadcast by the scheduler.

20. A processor comprising:
a scheduler having a plurality of entries; and
a mapper circuit configured to provide, to the scheduler:
instruction operations;
an index for ones of the instruction operations indicating a particular one of the plurality of entries in which it is to be stored; and
a dependency index for those instruction operations having a dependency on another instruction operation previously provided to the scheduler;
wherein the scheduler is further configured to:
generate a dependency index indicating any dependencies between instruction operations provided concurrently from the mapper circuit;
broadcast an index associated with a first instruction operation to the plurality of entries responsive to selecting the first instruction operation for issue;
determine, responsive to a match between the index associated with the first instruction operation and a dependency index associated with a second instruction operation, that the second instruction operation is dependent upon the first instruction operation; and
indicate that the second instruction is ready for issue responsive to the determining.

\* \* \* \* \*